Sept. 11, 1962　　　O. E. ROSAEN ETAL　　　3,053,389
OIL FILTERS

Filed March 28, 1957　　　2 Sheets-Sheet 1

INVENTORS
OSCAR E. ROSAEN
NILS ROSAEN
BY
ATTORNEYS

Sept. 11, 1962     O. E. ROSAEN ETAL     3,053,389
OIL FILTERS

Filed March 28, 1957     2 Sheets-Sheet 2

INVENTORS
OSCAR E. ROSAEN
BY NILS ROSAEN

ATTORNEYS 3,053,389
OIL FILTERS
Oscar E. Rosaen, Grosse Pointe, and Nils O. Rosaen, Detroit, Mich., assignors to The Rosaen Filter Company, Hazel Park, Mich., a corporation of Michigan
Filed Mar. 28, 1957, Ser. No. 649,059
5 Claims. (Cl. 210—90)

The present invention relates to oil filters particularly devised for use with systems requiring the supply of clean oil, usually under pressure. Such systems are conventionally supplied by pumping oil from a supply, the oil being supplied to the pump through an intake pipe provided with a filter device submerged in the oil supply.

In such devices, when the filter begins to become clogged, such clogging is difficult to detect before the system to which the oil is supplied becomes starved or receives less oil than is desirable or an excessive load is put on the pump drive means.

Among the objects of the present invention is to provide a filter device for such uses which will signal the clogging before it reaches an undesirable extent.

Another object is to provide a filter which will bypass the oil when the clogging becomes excessive and when and if the signal is not observed or is ignored to thereby protect the system and prevent serious damage to pumps and other components of the system.

A further object of the invention is to provide a filter device for hydraulic systems with by-pass means for by-passing the fluid around the filtering element when the element becomes excessively clogged with filtered dirt, and in which device provision is made for clearly indicating to an attendant the precise condition of the filter element at any time and which indicating means will clearly signal the need for changing the filter element before actual by-passing of the fluid occurs.

Still other objects and advantages will be apparent to those skilled in the art upon reference to the following description and the accompanying drawings in which FIG. 1 is a perspective view, more or less diagrammatic, indicating the mounting of one of the present filters.

Figure 1:
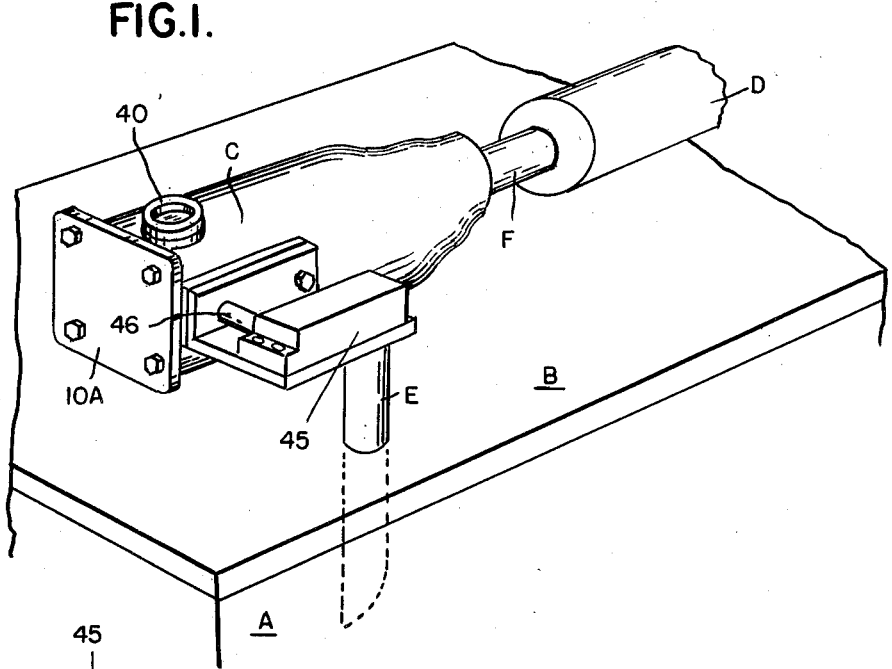
Figure 4:
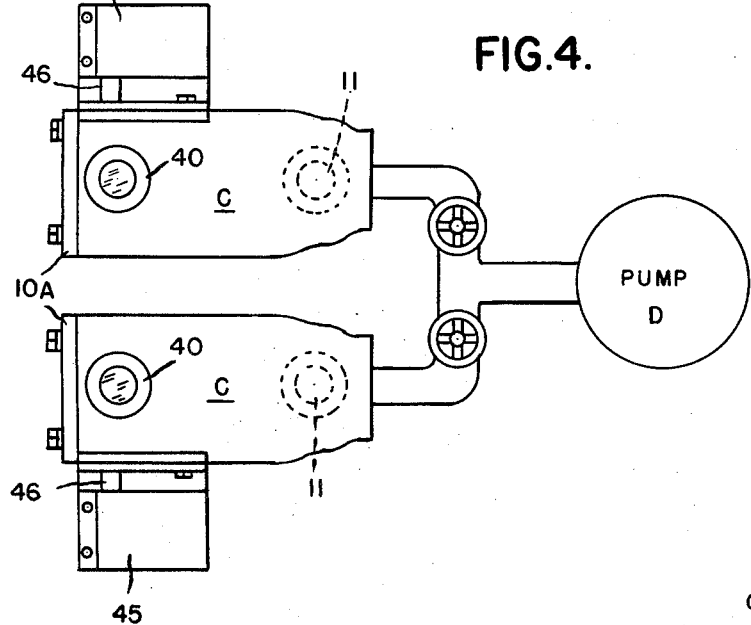
FIG. 4 is a plan view showing a multiple installation of the filters.

In the drawing showing the preferred form of mounting the present filter, there is shown diagrammatically an oil supply tank A provided with a cover B upon which is mounted the filter C and a pump D which may be of any suitable type. The conduit E leads to the filter C from within the tank A and the conduit F leads from the outlet of the filter to the intake to the pump D.

Figure 2:
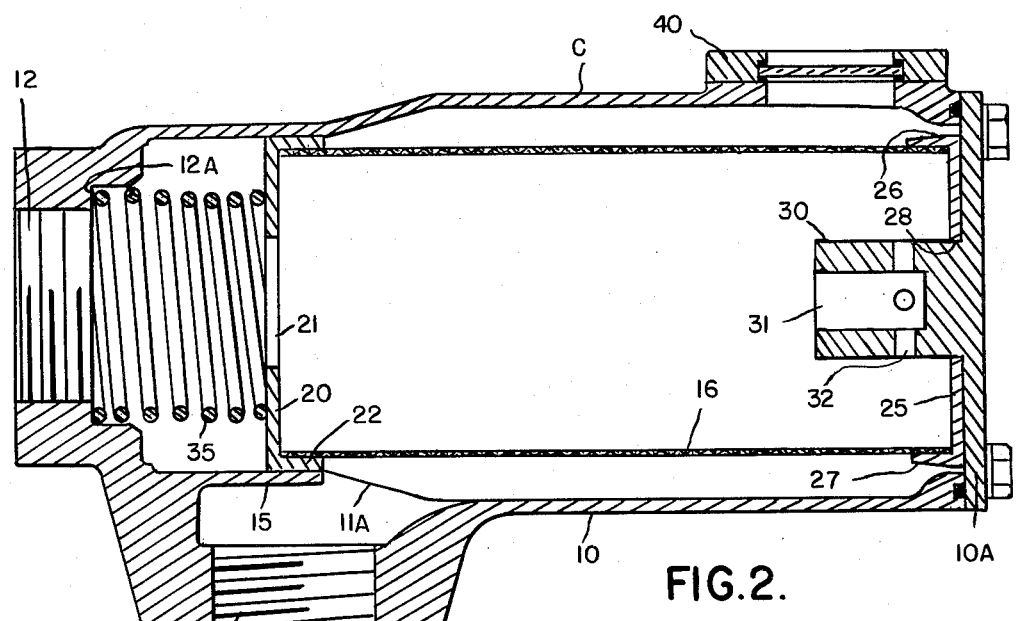
FIG. 2 is a sectional view of the filter as if on line 2—2 of FIG. 3.
Figure 3:
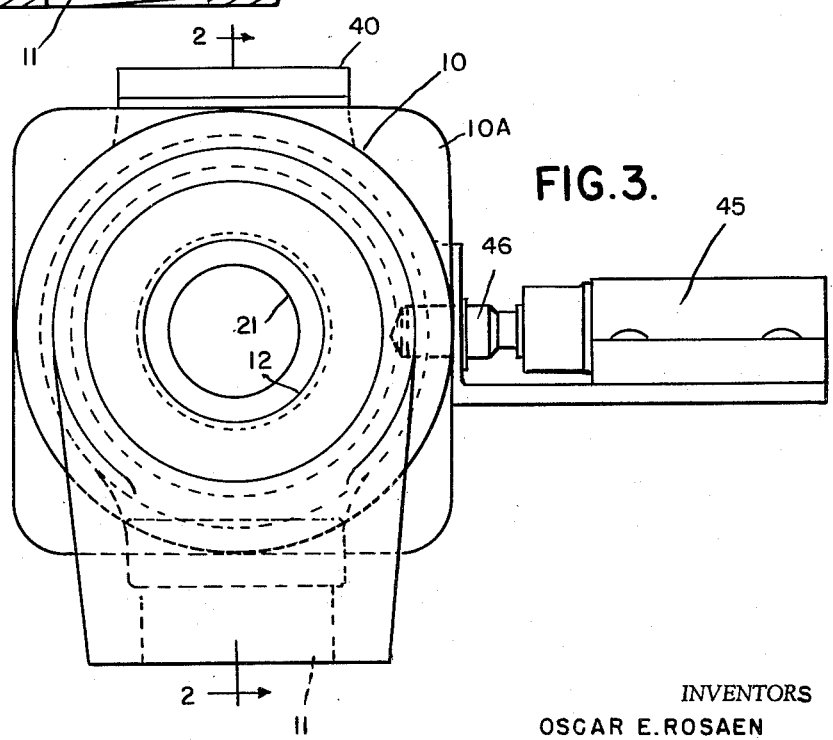
FIG. 3 is an end view from the left of FIG. 2.

The preferred form of the filter involved in the present invention as shown in detail in FIGS. 2 and 3 and consists of an outer shell 10 having integral therewith an inlet 11 and an outlet 12, both preferably threaded for the attachment of suitable conduits (not shown). The inlet 11 will preferably be upon the lower side adjacent the outlet end and the outlet 12 will preferably be at one end of the shell and coaxial therewith.

Within the shell 10 and surrounding the outlet there is provided a short cylinder 15 suitably formed partly from the shell and partly from an added web within the shell. This cylindrical structure conveniently extends part way over the inlet 11 which may be provided with an enlargement 11A so as not to restrict the inflow.

Inside of the cylinder 15 and surrounding the outlet 12 is provided a shoulder 12A, the purpose of which will be described later.

Within the shell 10 is mounted a cylindrical filter, consisting of a sheet of fine mesh, preferably metallic, screen material formed into a cylinder 16 seated at each end in a flanged disc, the two discs being slightly different and designated by the numerals 20 and 25. The filter element or cartridge, as it is sometimes referred to, which is the replaceable element in the filter unit, thereby comprises the cylindrical screen 16 together with its two end discs or caps 20 and 25.

As shown, the disc 20, at the outlet end of the filter is provided with a large central opening 21 to permit flow of fluid from within the cylindrical filter screen 16 to the outlet 12. Additionally the disc 20 is provided with a flange 22, within which is seated the screen cylinder 16, the flange being finished on its outer surface to provide a sliding fit within the shell cylinder 15.

The disc 25 is also provided with a flange 26, within which the screen cylinder 16 is seated, which flange is finished on its outer face to provide a sloping surface 27, sloping away from the face of the disc. Disc or end cap 25 is also provided with an axial opening 28 arranged to have a sliding fit with and receive a guide or pilot member 30 formed as an inwardly directed boss upon the closure plate 10A of the shell 10 and located coaxial with the screen 16 and disc 25. While the surface of the opening 28 in the disc 25 is finished to provide a smooth sliding fit with the boss or guide member 30, the outer surface of disc 25 bearing against the interior face of the closure plate 10A is not finished to the same degree, but is in fact sufficiently rough enough to permit the entry of oil between these abutting surfaces during operation of the system.

The boss or pilot member 30 is provided with an axial bore 31 and near its end with a plurality of radial openings 32 leading from the outside to said bore.

As shown clearly in FIG. 2, the length of the screen 16 and discs 20 and 25 is such that when the disc 25 is against the closure plate 10A, the disc 20 is within the end of the shell cylinder 15 and this position is maintained through the action of a suitable compression spring 35 seated upon the shoulder 12A and abutting the disc 20. Spring 35 is selected of a strength adequate to retain the filter 16, when clean, in the extreme right hand position of the casing as viewed in FIG. 2, the spring selection being based on the rating of the pump of the particular system and the desired permissible pressure drop between the inlet 11 and outlet 12 of the unit when the pump and system are in operation.

In operation, the pump drawing oil through the filter causes the flow of oil in through the inlet 11 into the shell in the space outside of the screen or filter element 16 and through the interstices of the latter and out through the opening 21 in disc 20 to the outlet 12, from where it passes to the pump intake through conduit F. However, in continued use of the filter, solids filtered out of the oil, gather on the outer surface of the screen and decrease the oil flow therethrough, so that eventually, as clogging of the screen progresses, the pressure differential between the outlet and inlet will exceed the selected or predetermined permissible pressure drop and becomes great enough to compress the spring 35 and allow the screen to move toward the outlet and away from the plate 10A. This condition will then result in a gradual movement of the filter element or cartridge away from the plate 10A towards the outlet end of the casing against the spring and compressing the latter, in response to the differences in pressure. If the spring 35 is compressed sufficiently, the disc 25 will move far enough to uncover the openings 32 and the oil will then flow through these openings and bore 31 directly to the interior of the screen and bypass the filter screen 16.

It will be apparent that the present construction as shown in FIG. 2 is such that movement of the filter to the left due to an increase in pressure differential does not uncover any additional areas to pressure, since the disc 20 is at all times piloted within the shell cylinder 15 and the opening 28 of the disc 25 is at all times piloted on the guide boss 30. Operating pressure differential occurs substantially only between the inner and the outer faces of the disc 25. Hence the filter element acts as a true piston, as opposed to conventional poppet valve devices, and being urged to the right by the spring 35, the filter will, after it starts to move, tend to assume a position where spring pressure is balanced by fluid pressure forces. The greater the fluid pressure differential caused by clogging of the filter screen, the greater the compression of the spring 35. The degree of movement of the filter toward the by-pass position is thus a linear function of pressure drop across the filter screen. The by-passing which occurs when the disc 25 reaches the openings 32 imposes a limit on allowable pressure drop so that the pump will not be injured through cavitation.

Since such bypassing, while necessary under emergency conditions, is highly undesirable normally, means is provided for detection of the screen movement before it reaches the bypass position and hence forewarn the operator that the filter cartridge is becoming dirty and is in need of changing or cleaning.

One such means is shown at 40 as a sight glass through which the position of the disc 25 may be observed, the flange 26 of the disc being provided with an easily seen color marking.

Another and preferable detection means is indicated at 45 as a sensitive electric switch of the form commonly known as a "microswitch," this being one in which the switch actuating means will actuate the "make" and "break" elements with a very small movement.

As shown, the switch 45 will be mounted upon the shell 10 and be provided with an actuating plunger 46 extending into the shell and having a rounded or suitably contoured end which coacts with the inclined face of the flange 26 of disc 25. The actuating plunger 46 is preferably, as shown, not spring-pressed inwardly of the shell 10, since under normal operation of the system with a clean filter element in place the pressure within the housing is considerably lower than atmospheric pressure and hence the plunger will be pulled inwardly thereof and limited in its inward movement by a snap ring firmly held against the bracket wall as shown in FIG. 3. As the plunger 46 is moved outwardly by engagement with the flange of the disc 25 on axial movement of the filter cartridge, said plunger will carry with it the snap ring so that observation of the position of the snap ring or the plunger end generally with reference to the supporting bracket on the side of the shell 10 will give a preliminary indication that the filter is becoming excessively clogged and that the same should be changed. The permissible movement of the plunger away from the supporting wall may be only a short distance before the microswitch is engaged and actuated, but this distance is adequate to forewarn an alert attendant that the filter needs attention. However, failure to observe the movement of the plunger and snap ring will not become fatal, for in the present construction signal means is also provided, such as mentioned above, which will be actuated through the circuit controlled by switch 45 when the latter is closed, which closing is likewise prior to the openings of the by-pass means.

The circuit through the switch 45 may be through any desired signal means, such as a buzzer or a light, or to any other suitable device. One such device could be means controlling the operation of the pump drive.

We claim:

1. An oil filter comprising a generally cylindrical housing, a laterally arranged oil inlet thereto, an axially arranged oil outlet therefrom, the housing wall surrounding said outlet being finished to provide a cylinder, an annular piston-like element slidable in said cylinder and carrying one end of a cylindrical filter element surrounding the opening in the piston annulus, said filter element extending longitudinally of the housing and spaced from the wall of the housing, a ring abutting the other end of said filter element and fixed thereto, a closure plate for said housing at the end opposite said outlet, said plate having an inwardly directed boss coaxial with said ring and slidably fitting the opening therein, said boss being provided with a passageway leading therethrough from the periphery of said boss adjacent the inner end thereof to the interior of said filter element, spring means for maintaining the piston, filter element and ring assembly against said closure plate with said boss closing the ring opening, said spring means permitting the said assembly to move axially away from said plate and to eventually uncover and expose said passageway in said boss to the incoming oil for by-passing of said filter element in response to an increase in pressure differential between the outlet and inlet sufficient to overcome the strength of said spring due to clogging of said filter element by filtered dirt particles indicating means mounted exteriorly of said housing, and a reciprocal actuating element for said last named means mounted to extend through said shell transversely to the direction of axial movement of said filter element with its inner end positioned adjacent to but in spaced relation from said ring but engageable with and operatively movable by a surface of said ring on axial movement of said filter element to thereby give an indication of the condition of said filter element before said ring has been moved to by-passing position.

2. A fluid filter of the suction type for fluid systems comprising a shell provided with a fluid inlet and outlet and having a cylindrical filter element contained therein so that fluid flowing from the inlet will be filtered on passing through the cylindrical wall of said element on its way to the outlet, guide means carried by said shell for slidably supporting said filter element at both ends thereof to permit an appreciable axial movement of said filter element in said shell when the pressure differential between the outlet and the inlet exceeds a predetermined value as progressive clogging of said filter element occurs, spring means for holding said filter element against movement, the strength of said spring means constituting said predetermined value, indicator means positioned exteriorly of said shell, actuating means extending through a wall of said shell and transversely to the axis of said filter element and positioned with its inner end adjacent to and engageable with an actuating element carried by said axially movable filter element for actuating said indicator means, said indicator means and actuating means being wholly independent of said filter element and mounted so as to give an indication of the condition of said filter element by the movement of said filter element.

3. A fluid filter of the suction type for fluid systems comprising a shell provided with a fluid inlet and outlet and having a cylindrical filter element mounted therein so that fluid flowing from the inlet will be filtered on passing through the cylindrical wall of said element on its way to the outlet, guide means carried by said shell for slidably supporting said filter element to permit an appreciable axial movement of said filter element in said shell when the pressure differential between the outlet and the inlet exceeds a predetermined value as progressive clogging of the filter element occurs, a by-pass valve means controlled by said movement of the filter element and opened only after a predetermined axial movement of said element for by-passing incoming fluid around said element, spring means for holding said filter element against movement with said by-pass valve means closed, indicator means positioned exteriorly of said shell, and actuating means extending through a wall of said shell transversely to the axis of said filter element with the inner end thereof positioned adjacent to and engageable with an actuating element carried by said axially movable filter element for actuating said indicator means on movement of said filter element, said indicator means and actuating means being wholly independent of said filter element and mounted so as to give an indication of the condition of said filter element by the movement of said filter element before said by-pass valve is opened.

4. A fluid filter of the suction type for fluid systems comprising a shell provided with a fluid inlet and outlet and having a cylindrical filter element mounted therein so that fluid flowing from the inlet will be filtered on passing through the cylindrical wall of said element on its way to the outlet, guide means for mounting said filter element to permit an appreciable axial movement of said filter element in said shell when the pressure differential between the outlet and the inlet exceeds a predetermined value as progressive clogging of said filter element occurs, said filter element having substantially constant effective areas exposed at all times to the respective inlet and outlet pressures during axial movement of the filter element, spring means for biasing said filter element against axial movement, said cylindrical filter element containing at least one end cap, indicating means mounted exteriorly of said housing, a reciprocal actuating element for said last named means mounted to extend through said shell transversely to the direction of axial movement of said element with its inner end positioned adjacent to but in spaced relation from said end cap, said end cap being formed with a cam surface to cooperatively engage the inner end of said actuating element on axial movement of said filter element to thus move said actuating element outwardly to effect an indication of the condition of said filter.

5. A fluid filter of the suction type for fluid systems comprising a shell provided with a fluid inlet and outlet and having a cylindrical filter element mounted therein so that fluid flowing from the inlet will be filtered on passing through the cylindrical wall of said element on its way to the outlet, guide means for mounting said filter element to permit an appreciable axial movement of said filter element in said shell when the pressure differential between the outlet and the inlet exceeds a predetermined value as progressive clogging of said filter element occurs, said filter element having substantially constant effective areas exposed at all times to the respective inlet and outlet pressures during axial movement of the filter element, spring means for biasing said filter element against axial movement, indicating means comprising a movable indicator element carried by said shell and an actuating element carried by said filter element, said indicator element having a visible exterior portion and an interior portion, the latter positioned to be engageable with the actuating element of said filter element but completely separate therefrom and operably moved thereby on axial movement of said filter element, the degree of motion of said indicator element being relative to the degree of axial movement of said filter element.

References Cited in the file of this patent

UNITED STATES PATENTS

| | | |
|---|---|---|
| 1,506,967 | Bosworth | Sept. 2, 1924 |
| 1,536,393 | Hellmann et al. | May 5, 1925 |
| 1,805,450 | Harvey | May 12, 1931 |
| 2,183,616 | Korte | Dec. 19, 1939 |
| 2,287,670 | Dever | June 23, 1942 |
| 2,302,116 | Gill | Nov. 17, 1942 |
| 2,348,651 | Schelly | May 9, 1944 |
| 2,422,647 | Vokes | June 17, 1947 |
| 2,439,936 | Kasten | Apr. 20, 1948 |

FOREIGN PATENTS

| | | |
|---|---|---|
| 446,027 | Great Britain | Apr. 23, 1936 |
| 700,661 | Great Britain | Dec. 9, 1953 |
| 761,940 | Great Britain | Nov. 21, 1956 |